US010263659B2

(12) United States Patent
Li et al.

(10) Patent No.: US 10,263,659 B2
(45) Date of Patent: Apr. 16, 2019

(54) APPARATUS AND METHOD FOR DETERMINING TRANSMISSION DIRECTION OF SECONDARY CARRIER

(71) Applicant: HUAWEI TECHNOLOGIES CO., LTD., Shenzhen, Guangdong (CN)

(72) Inventors: Bingzhao Li, Beijing (CN); Wei Quan, Beijing (CN); Xiaodong Yang, Beijing (CN); Jian Zhang, Beijing (CN); Zhenxing Hu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 74 days.

(21) Appl. No.: 15/358,529

(22) Filed: Nov. 22, 2016

(65) Prior Publication Data

US 2017/0077985 A1 Mar. 16, 2017

Related U.S. Application Data

(63) Continuation of application No. PCT/CN2014/078221, filed on May 23, 2014.

(51) Int. Cl.
*H04W 72/04* (2009.01)
*H04B 1/50* (2006.01)
(Continued)

(52) U.S. Cl.
CPC ............. *H04B 1/50* (2013.01); *H04L 1/00* (2013.01); *H04L 5/001* (2013.01); *H04L 5/14* (2013.01);
(Continued)

(58) Field of Classification Search
CPC ......... H04B 1/50; H04B 2215/00; H04L 1/00; H04L 5/001; H04L 5/0073; H04L 5/14;
(Continued)

(56) References Cited

U.S. PATENT DOCUMENTS

2013/0028149 A1 1/2013 Chen et al.
2013/0188532 A1 7/2013 Zhang et al.
(Continued)

FOREIGN PATENT DOCUMENTS

CN 102035594 4/2011
CN 102149099 A 8/2011
(Continued)

OTHER PUBLICATIONS

International Search Report dated Feb. 26, 2015 in corresponding International Application No. PCT/CN2014/078221.
(Continued)

*Primary Examiner* — Robert J Lopata
(74) *Attorney, Agent, or Firm* — Staas & Halsey LLP

(57) ABSTRACT

Embodiments of the present invention provide an apparatus and a method for determining a transmission direction of a secondary carrier. A reference carrier of a first secondary carrier is obtained according to network configuration information, and a transmission direction of a subframe on the first secondary carrier is determined according to a transmission direction of a subframe on the reference carrier, so that data transmission directions of the reference carrier and the first secondary carrier are the same at a same moment. A transmission direction of data of the subframes on the first secondary carrier transmitted in a frequency band adjacent to a frequency band of the reference carrier is determined by using the reference carrier, thereby avoiding interference occurring when the adjacent frequency bands simultaneously transmit data of different directions.

3 Claims, 6 Drawing Sheets

(51) Int. Cl.
*H04L 1/00* (2006.01)
*H04L 5/00* (2006.01)
*H04L 5/14* (2006.01)
*H04W 72/12* (2009.01)

(52) U.S. Cl.
CPC ..... *H04W 72/042* (2013.01); *H04W 72/0446* (2013.01); *H04W 72/1268* (2013.01); *H04W 72/1273* (2013.01); *H04B 2215/00* (2013.01); *H04L 5/0073* (2013.01)

(58) Field of Classification Search
CPC ........... H04W 72/042; H04W 72/0446; H04W 72/1268; H04W 72/1273
USPC .......................................................... 370/278
See application file for complete search history.

(56) References Cited

U.S. PATENT DOCUMENTS

| | | | |
|---|---|---|---|
| 2014/0126501 A1 | 5/2014 | Pan et al. | |
| 2014/0198752 A1* | 7/2014 | Hsieh | H04W 72/0446 370/329 |
| 2014/0301255 A1* | 10/2014 | Yin | H04L 5/14 370/280 |
| 2015/0117275 A1* | 4/2015 | Park | H04L 1/1812 370/280 |
| 2015/0188793 A1* | 7/2015 | Zhao | H04L 5/1469 370/242 |
| 2015/0256359 A1* | 9/2015 | Wang | H04J 11/005 370/252 |
| 2015/0372798 A1* | 12/2015 | Zhao | H04L 5/14 370/280 |
| 2016/0006529 A1* | 1/2016 | Yi | H04J 11/0056 370/329 |
| 2016/0007323 A1* | 1/2016 | Suzuki | H04L 5/0053 370/329 |
| 2016/0066288 A1* | 3/2016 | Feng | H04W 52/54 370/280 |
| 2016/0143035 A1* | 5/2016 | Xue | H04L 5/001 370/329 |
| 2016/0241434 A1* | 8/2016 | Li | H04B 7/2656 |
| 2016/0242188 A1* | 8/2016 | Tiirola | H04W 24/10 |
| 2017/0170931 A1* | 6/2017 | Kusashima | H04L 1/1861 |
| 2017/0245169 A1* | 8/2017 | Song | H04W 24/10 |
| 2017/0331611 A1* | 11/2017 | Stern-Berkowitz | H04L 1/1854 |
| 2018/0054824 A1* | 2/2018 | Xue | H04W 72/048 |

FOREIGN PATENT DOCUMENTS

| | | |
|---|---|---|
| CN | 102271414 A | 12/2011 |
| CN | 102548007 A | 7/2012 |
| CN | 103391152 | 11/2013 |
| CN | 103490870 | 1/2014 |
| EP | 2717640 | 9/2014 |

OTHER PUBLICATIONS

International Search Report dated Feb. 26, 2015 in corresponding International Patent Application No. PCT/CN2014/078221.
Extended European Search Report dated Mar. 15, 2017 in corresponding European Patent Application No. 14892718.9.
Nokia Siemens Networks: "Views on inter-band CA with different TDD configurations on different bands", 3GPP Draft; R1-113136,3rd Generation Partnership Project (3GPP), Mobile Competence Centre ; 650, Route Des Lucioles; F-06921 Sophia-Anti Polis Cedex; France, vol. RAN WG1, No. Zhuhai; Oct. 10, 2011, Oct. 4, 2011.
Chinese Office Action for Chinese Application No. 201480018603.2 dated May 3, 2018, 6 pp.
Shicheng Wu, "Performance Analysis for Relay-based Device-to-Device Communication System in LTE Networks", Thesis submitted to Nanjing University of Posts and Telecommunications for the Degree of Master of Engineering; Apr. 2013, 66 pages.

* cited by examiner

APPARATUS AND METHOD FOR DETERMINING TRANSMISSION DIRECTION OF SECONDARY CARRIER

CROSS-REFERENCE TO RELATED APPLICATIONS

This application is a continuation of International Application No. PCT/CN2014/078221, filed on May 23, 2014, the disclosure of which is hereby incorporated by reference in its entirety.

TECHNICAL FIELD

The present disclosure relates to the field of communications technologies, and in particular, to an apparatus and a method for determining a transmission direction of a secondary carrier.

BACKGROUND

In a mobile communications system, a carrier spectrum for data transmission is divided into three parts: a frequency division duplexing (FDD) uplink frequency band, a time division duplexing (TDD) frequency band, and an FDD downlink frequency band. In FDD, uplink data is permanently transmitted in an FDD uplink frequency band, and downlink data is permanently transmitted in an FDD downlink frequency band. In FDD, data uplink transmission and data downlink transmission are separately performed by using two frequency bands of different frequencies. In TDD, uplink data and downlink data are both transmitted in a TDD frequency band, and uplink data and downlink data are separately transmitted in different timeslots by using a TDD frequency band.

As shown in FIG. 1, to avoid interference between FDD uplink data transmission and TDD downlink data transmission, there is a guard band of a particular width between an FDD uplink frequency band and a TDD frequency band. Similarly, to avoid interference between TDD uplink data transmission and FDD downlink data transmission, there is also a guard band of a particular width between a TDD frequency band and an FDD downlink frequency band.

One TDD frame consists of 10 subframes, where some subframes are uplink data, and some subframes are downlink data. As shown in FIG. 2, there are seven subframe uplink-downlink configuration relationships in total, where the black represents a downlink data frame, the grey represents an uplink data frame, the white represents a gap, and the stripe represents a special subframe. If TDD frames transmitted by two adjacent frequency bands within a TDD frequency band use different subframe uplink-downlink configuration relationships, there is interference into each other when subframes transmitted by two adjacent data transmission frequency bands are in different directions. Therefore, a guard band of a particular width also needs to be added between two adjacent data transmission frequency bands within the TDD frequency band.

Although interference occurring when data in different directions are transmitted in adjacent frequency bands can be avoided by using a guard band, the guard band causes waste of frequency resources.

SUMMARY

In view of this, embodiments of the present invention provide an apparatus and a method for determining a transmission direction of a secondary carrier. A transmission direction of a subframe on a first secondary carrier is determined by using a reference carrier, to avoid interference occurring when data in different directions is transmitted in adjacent frequency bands.

A first aspect of the embodiments of the present invention provides an apparatus for determining a transmission direction of a secondary carrier, where the apparatus includes:

an obtaining unit, configured to obtain a reference carrier of a first secondary carrier according to network configuration information; and a determining unit, configured to determine a transmission direction of a subframe on the first secondary carrier according to a transmission direction of a subframe on the reference carrier, so that data transmission directions of the reference carrier and the first secondary carrier are the same at a same moment.

In a first possible implementation manner of the first aspect of the embodiments of the present invention, when the first secondary carrier is a secondary carrier transmitting only uplink data, the determining unit includes:

a first determining subunit, configured to determine an uplink transmission subframe of the first secondary carrier according to an uplink transmission subframe of the reference carrier; and/or a second determining subunit, configured to determine an uplink transmission part of a special subframe of the first secondary carrier according to an uplink transmission part and/or a gap GAP in a special transmission subframe of the reference carrier.

In a second possible implementation manner of the first aspect of the embodiments of the present invention, when the first secondary carrier is a secondary carrier transmitting only downlink data, the determining unit includes:

a third determining subunit, configured to determine a downlink transmission subframe of the first secondary carrier according to a downlink transmission subframe of the reference carrier; and/or a fourth determining subunit, configured to determine a downlink transmission part of a special subframe of the first secondary carrier according to a downlink transmission part and/or a GAP in a special transmission subframe of the reference carrier.

In a third possible implementation manner of the first aspect of the embodiments of the present invention, when the first secondary carrier is a secondary carrier not only transmitting uplink data but also transmitting downlink data, the determining unit includes:

any one or more of a fifth determining subunit, a sixth determining subunit, a seventh determining subunit, or an eighth determining subunit; where the fifth determining subunit is configured to: when subframes on first locations of two reference carriers both are uplink transmission subframes, determine a subframe on a first location of the first secondary carrier as an uplink transmission subframe;

the sixth determining subunit is configured to: when subframes on second locations of two reference carriers both are downlink transmission subframes, determine a subframe on a second location of the first secondary carrier as a downlink transmission subframe;

the seventh determining subunit is configured to: when there is a special subframe in subframes on third locations of two reference carriers, determine an uplink transmission part of a subframe on a third location of the first secondary carrier according to a part, which is used for uplink transmission or a GAP, in both subframes on the third locations of the two reference carriers; and the eighth determining subunit is configured to: when there is a special subframe in subframes on third locations of two reference carriers, determine a downlink transmission part of a subframe on a third location of the first secondary carrier according to a part, which is used for downlink transmission or a GAP, in both subframes on the third locations of the two reference carriers.

A second aspect of the embodiments of the present invention provides a device for transmitting data by using a secondary carrier, which is applied to a mobile terminal, where the device includes:

a receiving apparatus, configured to receive a first secondary carrier and a transmission carrier that are configured by a base station, where the transmission carrier includes a primary carrier;

the apparatus for determining a transmission direction of a secondary carrier according to the first aspect of the embodiments of the present invention to the third possible implementation manner of the first aspect, configured to determine a transmission direction of the first secondary carrier;

a boundary determining apparatus, configured to detect a subframe boundary of the reference carrier, and determine a subframe boundary of the first secondary carrier according to the subframe boundary of the reference carrier;

a sequence number determining apparatus, configured to detect a sequence number of a subframe of the reference carrier, and determine a sequence number of a subframe of the first secondary carrier according to the sequence number of the subframe of the reference carrier; and a data transmission apparatus, configured to perform uplink transmission and/or downlink receiving of data by using the first secondary carrier.

In a first possible implementation manner of the second aspect of the embodiments of the present invention, when the first secondary carrier is a secondary carrier transmitting only uplink data, the data transmission apparatus includes:

a first monitoring unit, configured to monitor physical downlink control channel (PDCCH) scheduling information of the first secondary carrier by means of the transmission carrier, where the PDCCH scheduling information includes any one or more of a PDCCH format 0, a PDCCH format 3, or a PDCCH format 3A; and a first transmission unit, configured to transmit uplink data according to the PDCCH scheduling information and by using the first secondary carrier.

In a second possible implementation manner of the second aspect of the embodiments of the present invention, when the first secondary carrier is a secondary carrier transmitting only downlink data, the data transmission apparatus includes:

a second monitoring unit, configured to monitor PDCCH downlink scheduling information of the first secondary carrier by means of the first secondary carrier or the transmission carrier, where the PDCCH downlink scheduling information includes a PDCCH format 1, a PDCCH format 1A, a PDCCH format 1B, a PDCCH format 1C, a PDCCH format 1D, a PDCCH format 2, or a PDCCH format 2A; and a second transmission unit, configured to receive downlink data according to the PDCCH scheduling information and by using the first secondary carrier.

In a third possible implementation manner of the second aspect of the embodiments of the present invention, when the first secondary carrier is a secondary carrier not only transmitting uplink data but also transmitting downlink data, the data transmission apparatus includes:

a third monitoring unit, configured to monitor PDCCH scheduling information of the first secondary carrier, where the PDCCH scheduling information includes PDCCH uplink scheduling information and PDCCH downlink scheduling information; and a third transmission unit, configured to transmit uplink data and downlink data according to the PDCCH scheduling information and by using the first secondary carrier.

A third aspect of the embodiments of the present invention provides a device for transmitting data by using a secondary carrier, which is applied to a base station, where the device includes:

a configuration apparatus, configured to configure a first secondary carrier and a transmission carrier, where the transmission carrier includes a primary carrier;

the apparatus for determining a transmission direction of a secondary carrier according to the first aspect of the embodiments of the present invention to the third possible implementation manner of the first aspect, configured to determine a transmission direction of the first secondary carrier; and a sending apparatus, configured to send the first secondary carrier whose transmission direction has been determined and the transmission carrier to a mobile terminal, so that the mobile terminal detects a subframe boundary of the reference carrier, and determines a subframe boundary of the first secondary carrier according to the subframe boundary of the reference carrier; detects a sequence number of a subframe of the reference carrier, and determines a sequence number of a subframe of the first secondary carrier according to the sequence number of the subframe of the reference carrier; and performs uplink receiving and/or downlink transmission of data by using the first secondary carrier.

A fourth aspect of the embodiments of the present invention provides a method for determining a transmission direction of a secondary carrier, where the method includes:

obtaining a reference carrier of a first secondary carrier according to network configuration information; and determining a transmission direction of a subframe on the first secondary carrier according to a transmission direction of a subframe on the reference carrier, so that data transmission directions of the reference carrier and the first secondary carrier are the same at a same moment.

In a first possible implementation manner of the fourth aspect of the embodiments of the present invention, when the first secondary carrier is a secondary carrier transmitting only uplink data, the determining a transmission direction of a subframe on the first secondary carrier according to a transmission direction of a subframe on the reference carrier includes:

determining an uplink transmission subframe of the first secondary carrier according to an uplink transmission subframe of the reference carrier; and/or determining an uplink transmission part of a special subframe of the first secondary carrier according to an uplink transmission part and/or a gap in a special transmission subframe of the reference carrier.

In a second possible implementation manner of the fourth aspect of the embodiments of the present invention, when the first secondary carrier is a secondary carrier transmitting only downlink data, the determining a transmission direction of a subframe on the first secondary carrier according to a transmission direction of a subframe on the reference carrier includes:

determining a downlink transmission subframe of the first secondary carrier according to a downlink transmission subframe of the reference carrier; and/or determining a downlink transmission part of a special subframe of the first secondary carrier according to a downlink transmission part and/or a GAP in a special transmission subframe of the reference carrier.

In a third possible implementation manner of the fourth aspect of the embodiments of the present invention, when the first secondary carrier is a secondary carrier not only transmitting uplink data but also transmitting downlink data, the determining a transmission direction of a subframe on the first secondary carrier according to a transmission direction of a subframe on the reference carrier includes any one or more of the following steps:

when subframes on first locations of two reference carriers both are uplink transmission subframes, determining a subframe on a first location of the first secondary carrier as an uplink transmission subframe;

when subframes on second locations of two reference carriers both are downlink transmission subframes, determining a subframe on a second location of the first secondary carrier as a downlink transmission subframe;

when there is a special subframe in subframes on third locations of two reference carriers, determining an uplink transmission part of a subframe on a third location of the first secondary carrier according to a part, which is used for uplink transmission or a GAP, in both subframes on the third locations of the two reference carriers; or when there is a special subframe in subframes on third locations of two reference carriers, determining a downlink transmission part of a subframe on a third location of the first secondary carrier according to a part, which is used for downlink transmission or a GAP, in both subframes on the third locations of the two reference carriers.

A fifth aspect of the embodiments of the present invention provides a method for transmitting data by using a secondary carrier, which is applied to a mobile terminal, where the method includes:

receiving a first secondary carrier and a transmission carrier that are configured by a base station, where the transmission carrier includes a primary carrier;

determining a transmission direction of the first secondary carrier according to the method according to the fourth aspect of the embodiments of the present invention to the third possible implementation manner of the fourth aspect;

detecting a subframe boundary of the reference carrier, and determining a subframe boundary of the first secondary carrier according to the subframe boundary of the reference carrier;

detecting a sequence number of a subframe of the reference carrier, and determining a sequence number of a subframe of the first secondary carrier according to the sequence number of the subframe of the reference carrier; and performing uplink transmission and/or downlink receiving of data by using the first secondary carrier.

In a first possible implementation manner of the fifth aspect of the embodiments of the present invention, when the first secondary carrier is a secondary carrier transmitting only uplink data, the performing uplink transmission of data by using the first secondary carrier includes:

monitoring physical downlink control channel PDCCH scheduling information of the first secondary carrier by means of the transmission carrier, where the PDCCH scheduling information includes any one or more of a PDCCH format 0, a PDCCH format, or a PDCCH format 3A; and transmitting uplink data according to the PDCCH scheduling information and by using the first secondary carrier.

In a second possible implementation manner of the fifth aspect of the embodiments of the present invention, when the first secondary carrier is a secondary carrier transmitting only downlink data, the performing downlink transmission of data by using the first secondary carrier includes:

monitoring PDCCH downlink scheduling information of the first secondary carrier by means of the first secondary carrier or the transmission carrier, where the PDCCH downlink scheduling information includes a PDCCH format 1, a PDCCH format 1A, a PDCCH format 1B, a PDCCH format 1C, a PDCCH format 1D, a PDCCH format 2, or a PDCCH format 2A; and receiving downlink data according to the PDCCH scheduling information and by using the first secondary carrier.

In a third possible implementation manner of the fifth aspect of the embodiments of the present invention, when the first secondary carrier is a secondary carrier not only transmitting uplink data but also transmitting downlink data, the performing transmission of uplink and downlink data by using the first secondary carrier includes:

monitoring PDCCH scheduling information of the first secondary carrier, where the PDCCH scheduling information includes PDCCH uplink scheduling information and PDCCH downlink scheduling information; and transmitting uplink data and downlink data according to the PDCCH scheduling information and by using the first secondary carrier.

A sixth aspect of the embodiments of the present invention provides a method for transmitting data by using a secondary carrier, which is applied to a base station, where the method includes:

configuring a first secondary carrier and a transmission carrier, where the transmission carrier includes a primary carrier;

determining a transmission direction of the first secondary carrier according to the method according to the fourth aspect of the embodiments of the present invention to the third possible implementation manner of the fourth aspect; and sending the first secondary carrier whose transmission direction has been determined and the transmission carrier to a mobile terminal, so that the mobile terminal detects a subframe boundary of the reference carrier, and determines a subframe boundary of the first secondary carrier according to the subframe boundary of the reference carrier; detects a sequence number of a subframe of the reference carrier, and determines a sequence number of a subframe of the first secondary carrier according to the sequence number of the subframe of the reference carrier; and performs uplink receiving and/or downlink transmission of data by using the first secondary carrier.

It can be known from the above content that, the embodiments of the present invention have the following beneficial effects:

The embodiments of the present invention provide an apparatus and a method for determining a transmission direction of a secondary carrier. A reference carrier of a first secondary carrier is obtained according to network configuration information, and a transmission direction of a subframe on the first secondary carrier is determined according to a transmission direction of a subframe on the reference carrier, so that data transmission directions of the reference carrier and the first secondary carrier are the same at a same moment. A transmission direction of data of the subframes on the first secondary carrier transmitted in a frequency band adjacent to a frequency band of the reference carrier is determined by using the reference carrier, thereby ensuring that data transmission directions are the same when data is simultaneously transmitted on the first secondary carrier and the reference carrier, and avoiding interference occurring when the adjacent frequency bands simultaneously transmit data of different directions.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To give a solution for implementing data transmission between two adjacent frequency bands, embodiments of the present invention provide an apparatus and a method for determining a transmission direction of a secondary carrier. Exemplary embodiments of the present invention are described below with reference to the accompanying drawings of the specification. It should be understood that the exemplary embodiments described herein are merely used to describe and explain the present invention, but not used to limit the present invention. In addition, in a case in which no conflict occurs, embodiments in this application and features in the embodiments can be combined with each other.

Embodiment 1

Figure 1:
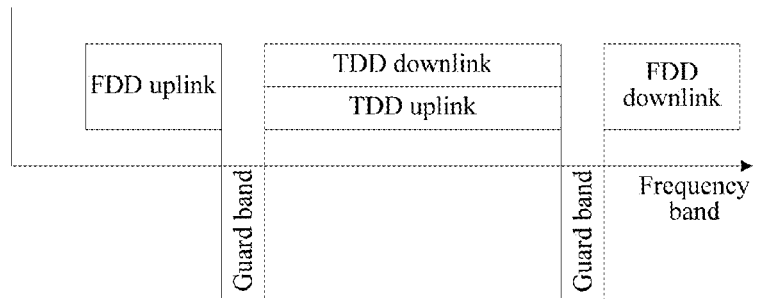
FIG. 1 is a schematic diagram of a guard band between an FDD frequency band and a TDD frequency band.
Figure 2:
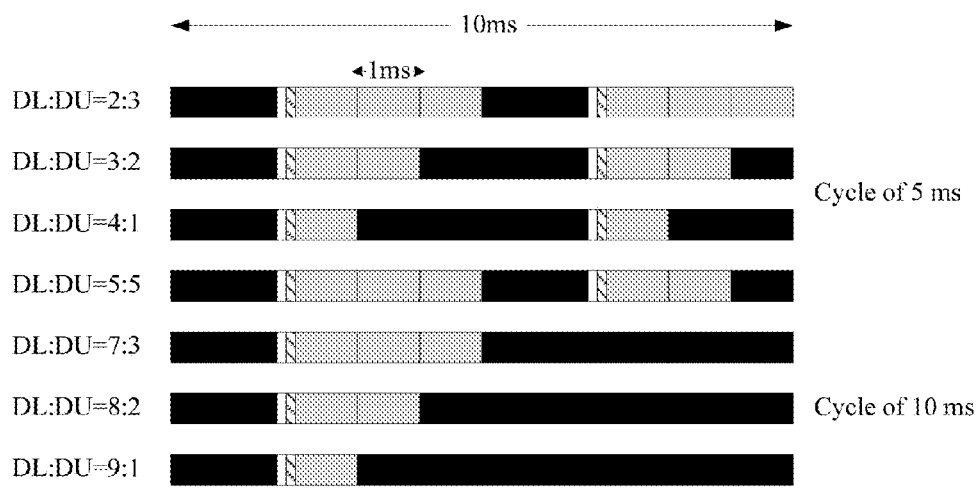
FIG. 2 is a schematic diagram of a subframe uplink-downlink configuration of a transmission carrier in a TDD frequency band.
Figure 3:
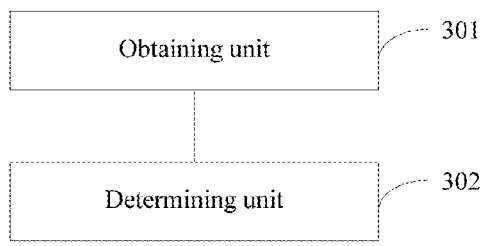
FIG. 3 is a schematic structural diagram of Embodiment 1 of an apparatus for determining a transmission direction of a secondary carrier according to the present invention.

FIG. 3 is a schematic structural diagram of Embodiment 1 of an apparatus for determining a transmission direction of a secondary carrier according to the present invention. The apparatus includes an obtaining unit 301 and a determining unit 302.

The obtaining unit 301 is configured to obtain a reference carrier of a first secondary carrier according to network configuration information.

The first secondary carrier and the reference carrier are transmitted in two adjacent frequency bands, or the reference carrier is the same as a second secondary carrier adjacent to the first secondary carrier, which includes: the reference carrier and the second secondary carrier have a same subframe transmission direction configuration, and the reference carrier and the second secondary carrier have same subframe timing. For example, a primary carrier, a first secondary carrier, and a second secondary carrier are configured on a network. The first secondary carrier is adjacent to the second secondary carrier, and the primary carrier and the second secondary carrier have a same configuration and same subframe timing. In this case, the reference carrier may be the second secondary carrier or may be the primary carrier.

A base station configures the first secondary carrier and a transmission carrier. The transmission carrier configured by the base station may include only a primary carrier or may include a primary carrier and at least one second secondary carrier. When there is only one reference carrier, the reference carrier may be a primary carrier, or may be a second secondary carrier; or when there are two reference carriers, there may be one primary carrier and one second secondary carrier, or there may be two second secondary carriers. This is set according to an actual situation.

Preconfigured network information mainly carries an identifier of a reference carrier selected according to a frequency band in which the first secondary carrier is transmitted. The preconfigured network configuration information may be preconfigured by the base station, or may be preconfigured by a mobile terminal. The base station may obtain the reference carrier of the first secondary carrier according to the preconfigured network configuration information preconfigured by the base station. The mobile terminal may obtain the reference carrier of the first secondary carrier according to preconfigured network configuration information that is received from a base station or the preconfigured network configuration information preconfigured by the mobile terminal.

Herein, it should be noted that, the base station or the mobile terminal presets the network configuration information generally according to the following rules. For example, the first secondary carrier is a carrier transmitted in a guard band between an FDD frequency band and a TDD frequency band or between two TDD frequency bands:

when the first secondary carrier is a carrier transmitted in a guard band between an FDD uplink frequency band and a TDD frequency band, a carrier that is on the TDD frequency band and that is closest to the guard band between the FDD uplink frequency band and the TDD frequency band is used as the reference carrier;

when the first secondary carrier is a carrier transmitted in a guard band between an FDD downlink frequency band and a TDD frequency band, a carrier that is on the TDD frequency band and that is closest to the guard band between the FDD downlink frequency band and the TDD frequency band is used as the reference carrier; or when the first secondary carrier is a carrier transmitted in a guard band between two frequency bands of TDD frequency bands, carriers in the two TDD frequency bands on two sides of the guard band are used as reference carriers.

Herein, it should be noted that, the first secondary carrier may further be a carrier transmitted in another frequency band as long as a carrier transmitted in a frequency band adjacent to that of the first secondary carrier is used as the reference carrier.

The determining unit 302 is configured to determine a transmission direction of a subframe on the first secondary carrier according to a transmission direction of a subframe on the reference carrier, so that data transmission directions of the reference carrier and the first secondary carrier are the same at a same moment.

After the reference carrier is determined, the first secondary carrier is configured according to the determined reference carrier. The determining unit 302 has three possible structures:

First possible structure: When the first secondary carrier is a secondary carrier transmitting only uplink data, the determining unit 302 includes:

a first determining subunit, configured to determine an uplink transmission subframe of the first secondary carrier according to an uplink transmission subframe of the reference carrier; or a second determining subunit, configured to determine an uplink transmission part of a special subframe of the first secondary carrier according to an uplink transmission part and/or a GAP in a special transmission subframe of the reference carrier.

A description is provided by using an example in which the first secondary carrier is a carrier transmitted in a guard band between a frequency division duplex FDD uplink frequency band and a TDD frequency band:

The first secondary carrier transmitted in the guard band between the FDD uplink frequency band and the TDD frequency band can transmit uplink data only when a reference carrier in the TDD frequency band transmits uplink data. In this case, the FDD uplink frequency band, the guard band, and the TDD frequency band in which the reference carrier closest to the guard band is located all transmit uplink data, and do not interfere with each other.

Figure 4:
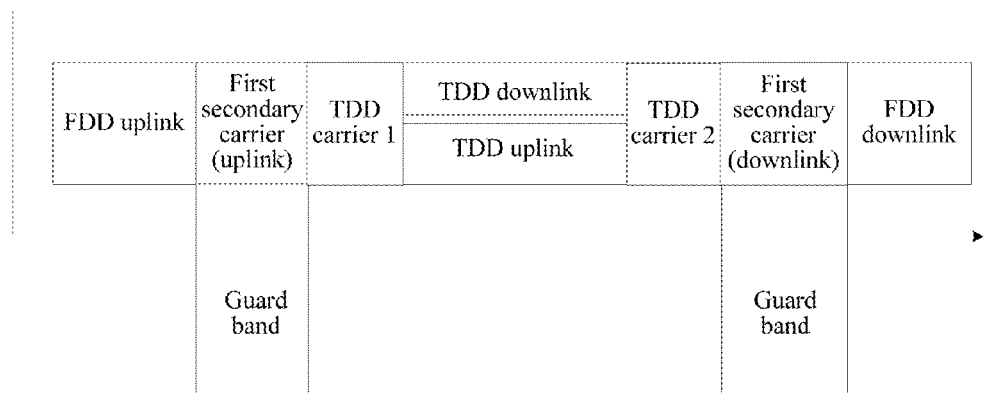
FIG. 4 is a schematic diagram of an uplink reference carrier and a downlink reference carrier of a first secondary carrier.
Figure 5:
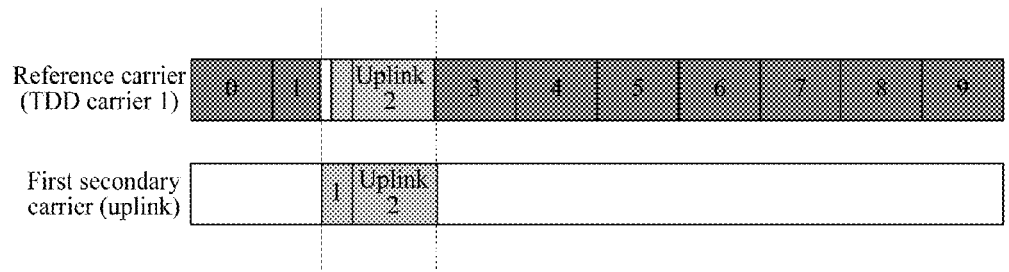
FIG. 5 is a schematic diagram of a transmission direction of a subframe when a first secondary carrier transmits only uplink data.

Therefore, the reference carrier is a carrier that is in the TDD frequency band and that is closest to the guard band between the FDD uplink frequency band and the TDD frequency band. As shown in FIG. 4, the reference carrier is a TDD carrier 1. The reference carrier is an uplink reference carrier, and an uplink data transmission part of a secondary carrier in a guard band is configured according to the reference carrier. As shown in FIG. 5, both the reference carrier and the first secondary carrier consist of 10 subframes, and the reference carrier includes an uplink subframe, a downlink subframe, and a special subframe.

The determining a transmission direction of a subframe on the first secondary carrier according to a transmission direction of a subframe on the reference carrier includes:

for a normal subframe, determining an uplink transmission subframe of the first secondary carrier according to an uplink transmission subframe of the reference carrier. As shown in FIG. 5, if the third subframe of the reference carrier is an uplink transmission subframe, the third subframe of the first secondary carrier is also configured to be an uplink transmission subframe; and for a special subframe, determining an uplink transmission part of the special subframe of the first secondary carrier according to an uplink transmission part and/or a GAP in a special transmission subframe of the reference carrier. The special subframe is a subframe on which uplink conversion is performed and that is in a TDD system. The special subframe includes a downlink transmission symbol (DWPTS) that is within a period, a GAP, and an uplink transmission symbol (UPPTS) that is within a period. As shown in FIG. 5, if the second subframe of the reference carrier is a special subframe, a part, which corresponds to a GAP and an uplink transmission symbol part of the second subframe of the reference carrier, of the second subframe of the first secondary carrier is used as an uplink transmission part. Herein, it should be noted that, a part, which corresponds to a GAP of a reference carrier, of a secondary carrier in a guard band may be an uplink transmission part or may be a blank guard band.

When the transmission direction of the subframe of the first secondary carrier is to be determined, an uplink transmission subframe of the first secondary carrier may be determined only according to an uplink transmission subframe of the reference carrier; or an uplink transmission part of a special subframe of the first secondary carrier may be determined according to an uplink transmission part and/or a GAP in a special transmission subframe of the reference carrier; or an uplink transmission subframe of the first secondary carrier may be determined according to an uplink transmission subframe of the reference carrier, and an uplink transmission part of a special subframe of the first secondary carrier may be determined according to an uplink transmission part and/or a GAP in a special transmission subframe of the reference carrier, which is specifically set according to a specific need and is not limited herein.

In this case, the first secondary carrier uses only the uplink transmission subframe, and the other parts do not transmit data, that is, neither receive data nor send data.

Second possible structure: When the first secondary carrier is a secondary carrier transmitting only downlink data, the determining unit 302 includes:

a third determining subunit, configured to determine a downlink transmission subframe of the first secondary carrier according to a downlink transmission subframe of the reference carrier; and/or a fourth determining subunit, configured to determine a downlink transmission part of a special subframe of the first secondary carrier according to a downlink transmission part and/or a GAP in a special transmission subframe of the reference carrier.

A description is provided by using an example in which the first secondary carrier is a carrier transmitted in a guard band between a frequency division duplex FDD downlink frequency band and a TDD frequency band:

The first secondary carrier transmitted in the guard band between the FDD downlink frequency band and the TDD frequency band can transmit downlink data only when a reference carrier in a TDD frequency band transmits downlink data. In this case, the FDD downlink frequency band, the guard band, and the TDD frequency band in which the reference carrier closest to the guard band is located all transmit downlink data, and do not interfere with each other.

Figure 6:
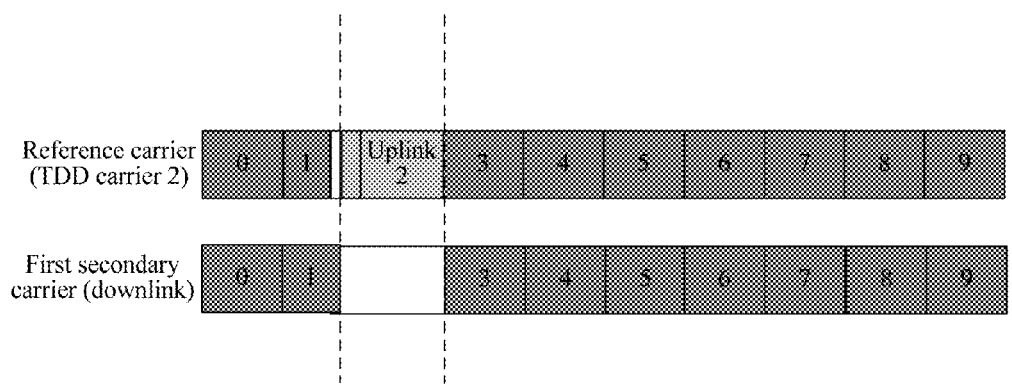
FIG. 6 is a schematic diagram of a transmission direction of a subframe when a first secondary carrier transmits only downlink data.

Therefore, the reference carrier is a carrier that is transmitted in the TDD frequency band and that is closest to the guard band between the FDD downlink frequency band and the TDD frequency band. As shown in FIG. 4, the reference carrier is a TDD carrier 2. The reference carrier is a downlink reference carrier, and a downlink data transmission part of the first secondary carrier is configured according to the reference carrier. As shown in FIG. 6, both the reference carrier and the first secondary carrier consist of ten subframes, and the reference carrier includes a downlink subframe, an uplink subframe, and a special subframe. Herein, it should be noted that, when there is only one primary carrier in the TDD frequency band, both an uplink reference carrier and a downlink reference carrier are the primary carrier in the TDD frequency band. When there are a primary carrier and at least one TDD secondary carrier in the TDD frequency band, an uplink reference carrier and a downlink reference carrier are generally different carriers. The uplink reference carrier is a reference carrier of a secondary carrier in a guard band between the FDD uplink frequency band and the TDD frequency band, and the downlink reference carrier is a reference carrier of a secondary carrier in a guard band between the FDD downlink frequency band and the TDD frequency band.

The determining a transmission direction of a subframe on the first secondary carrier according to a transmission direction of a subframe on the reference carrier includes:

for a normal subframe, determining a downlink transmission subframe of the first secondary carrier according to a downlink transmission subframe of the reference carrier. As shown in FIG. 6, the first subframe, the fourth subframe to the tenth subframe of the reference carrier are downlink transmission subframes, and it is determined that the first subframe, the fourth frame to the tenth subframe of the first secondary carrier are also downlink transmission subframes; and for a special subframe, determining a downlink transmission part of the special subframe of the first secondary carrier according to a downlink transmission part and/or a GAP in a special transmission subframe of the reference carrier GAP. As shown in FIG. 6, the second subframe of the reference carrier is a special subframe, and a part, which corresponds to a GAP and a downlink transmission symbol of the second subframe of the reference carrier, of the second subframe of the first secondary carrier is configured to be a downlink transmission part. Herein, it should be noted that, a part, which corresponds to the GAP of the reference carrier, of the first secondary carrier may be a downlink transmission part, or may be a blank guard band.

When the transmission direction of the subframe of the first secondary carrier is to be determined, a downlink transmission subframe of the first secondary carrier may be determined only according to a downlink transmission subframe of the reference carrier; or a downlink transmission part of a special subframe of the first secondary carrier may be determined according to a downlink transmission part and/or a GAP in a special transmission subframe of the reference carrier; or a downlink transmission subframe of the first secondary carrier may be determined according to a downlink transmission subframe of the reference carrier, and a downlink transmission part of a special subframe of the first secondary carrier may be determined according to a downlink transmission part and/or a GAP in a special transmission subframe of the reference carrier, which is specifically set according to a specific need and is not limited herein.

Herein, it should be noted that, in an example in this embodiment, a TDD carrier 1 and a TDD carrier 2 have a same subframe uplink-downlink configuration in a transmission direction, and have same subframe timing. Therefore, when network configuration information is to be preset, either of the TDD carrier 1 and the TDD carrier 2 may be set to be both an uplink reference carrier and a downlink reference carrier, or the TDD carrier 1 and the TDD carrier 2 may be separately set to be an uplink reference carrier and a downlink reference carrier. However, when uplink-downlink configuration relationships of the TDD carrier 1 and the TDD carrier 2 are different, the TDD carrier 1 and the TDD carrier 2 need to be separately set to be an uplink reference carrier and a downlink reference carrier.

In this case, the first secondary carrier uses only the downlink transmission subframe, and the other parts do not transmit data, that is, neither receive data nor send data.

Third possible structure: When the first secondary carrier is a secondary carrier not only transmitting uplink data but also transmitting downlink data, the determining unit 302 includes:

any one or more of a fifth determining subunit, a sixth determining subunit, a seventh determining subunit, or an eighth determining subunit, where the fifth determining subunit is configured to: when subframes on first locations of two reference carriers both are uplink transmission subframes, determine a subframe on a first location of the first secondary carrier as an uplink transmission subframe;

the sixth determining subunit is configured to: when subframes on second locations of two reference carriers both are downlink transmission subframes, determine a subframe on a second location of the first secondary carrier as a downlink transmission subframe;

the seventh determining subunit is configured to: when there is a special subframe in subframes on third locations of two reference carriers, determine an uplink transmission part of a subframe on a third location of the first secondary carrier according to a part, which is used for uplink transmission or a GAP, in both subframes on the third locations of the two reference carriers; and the eighth determining subunit is configured to: when there is a special subframe in subframes on third locations of two reference carriers, determine an uplink transmission part of a subframe on a third location of the first secondary carrier according to a part, which is used for downlink transmission or a GAP, in both subframes on the third locations of the two reference carriers.

A description is provided by using an example in which the first secondary carrier is a carrier transmitted in a guard band between two frequency bands of TDD frequency bands:

Only when transmission is performed in a same direction in the two frequency bands, the first secondary carrier transmitted in the guard band between the two frequency bands of the TDD frequency bands performs data transmission in a direction that is the same as the direction of the two frequency bands. In this case, the two TDD frequency bands and the guard band between the two frequency bands all perform data transmission in a same direction, and do not interfere with each other.

Figure 7:
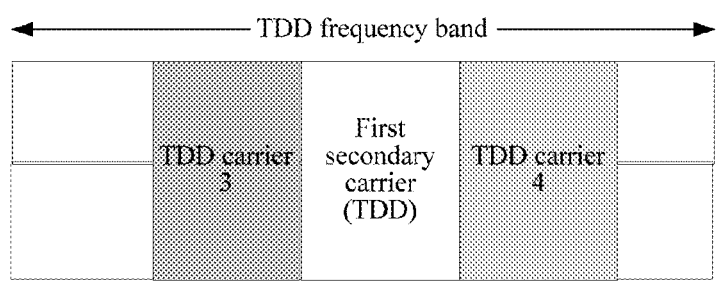
FIG. 7 is a schematic diagram of two reference carriers of a first secondary carrier.
Figure 8:
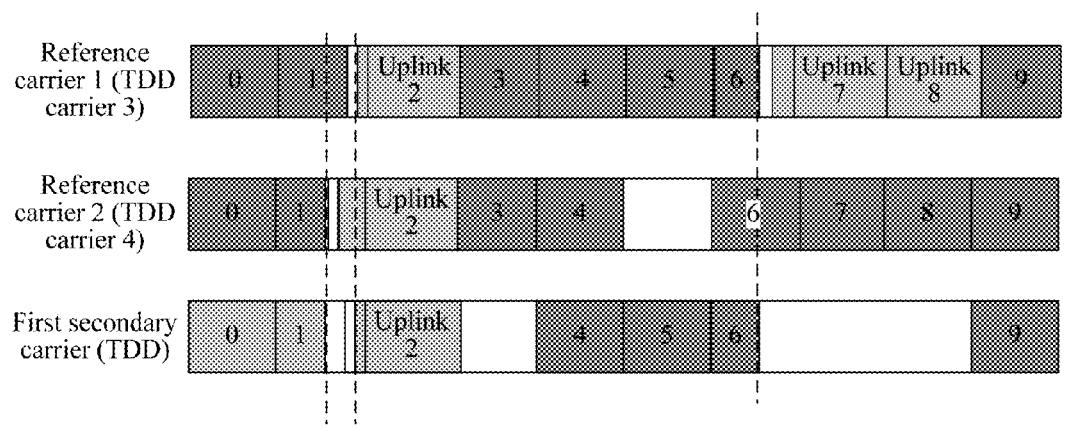
FIG. 8 is a schematic diagram of a transmission direction of a subframe when a first secondary carrier not only transmits uplink data but also transmits downlink data.

Therefore, the two reference carriers are two TDD carriers adjacent to two sides of a guard band. As shown in FIG. 7, the two reference carriers are a TDD carrier 3 and a TDD carrier 4. As shown in FIG. 8, the two reference carriers and the first secondary carrier all consist of ten subframes. The reference carrier includes a downlink subframe, an uplink subframe, and a special subframe. The two reference carriers are two TDD carriers that are respectively on two sides of the guard band and that are adjacent to the guard band.

The determining a transmission direction of a subframe on the first secondary carrier according to a transmission direction of a subframe on the reference carrier includes:

for a normal subframe, when subframes on first locations of two reference carriers both are uplink transmission subframes, determining a subframe on a first location of the first secondary carrier as an uplink transmission subframe. As shown in FIG. 8, if the third subframes of the two reference carriers both are uplink transmission subframes, it is determined that the third subframe of the first secondary carrier is also an uplink transmission subframe. The first locations refer to locations of uplink transmission subframes of the reference carriers in general when corresponding locations of the two reference carriers both are uplink transmission subframes. As shown in FIG. 8, first locations are locations of the third subframes of the two reference carriers;

for a normal subframe, when subframes on second locations of two reference carriers both are downlink transmission subframes, determining a subframe on a second location of the first secondary carrier as a downlink transmission subframe. As shown in FIG. 8, if the first subframes, the fifth subframes, the sixth subframes, and the tenth subframes of the two reference carriers all are downlink transmission subframes, it is determined that the first subframe, the fifth subframe, the sixth subframe, and the tenth subframe of the first secondary carrier are also downlink transmission subframes. The second locations refer to locations of downlink transmission subframes of the reference carriers in general when corresponding locations of the two reference carriers both are downlink transmission subframes. As shown in FIG. 8, locations of the first subframes, the fifth subframes, the sixth subframes, and the tenth subframes of the two reference carriers all are second locations; and for a special subframe, when there is a special subframe in subframes on third locations of two reference carriers, determining an uplink transmission part of a subframe on a third location of the first secondary carrier according to a part, which is used for uplink transmission or a GAP, in both subframes on the third locations of the two reference carriers. As shown in FIG. 8, the second subframe and the seventh subframe of a reference carrier 1 and the second subframe of a reference carrier 2 all are special subframes. For the second subframe of the reference carrier 1 and the second subframe of the reference carrier 2, it is determined that an uplink transmission part of the second subframe of the first secondary carrier is corresponding to a shorter uplink transmission symbol part in the second subframe of the reference carrier 1 and the second subframe of the reference carrier 2. It is determined that the uplink transmission part of the second subframe of the first secondary carrier is corresponding to the uplink transmission symbol part of the second subframe of the reference carrier 1.

Herein, it should be noted that, for a GAP in the second subframe of the reference carrier 1, a part, which corresponds to the GAP, of the first secondary carrier may be configured to be a GAP, or may be configured to be an uplink transmission part. For a GAP in the second subframe of the reference carrier 2, a part, which corresponds to the GAP, of a secondary carrier in a guard band may be configured to be GAP, or may be configured to be a downlink transmission part.

For the seventh special subframe of the reference carrier 1, the seventh subframe of the reference carrier 2 is a downlink transmission subframe, and in this case, it is determined that a downlink transmission part of the seventh subframe of the first secondary carrier is corresponding to a shorter downlink transmission symbol part in the seventh subframe of the reference carrier 1 and the seventh subframe of the reference carrier 2. As shown in FIG. 8, a downlink transmission symbol part of the seventh subframe of the reference carrier 1 is shorter than a downlink transmission symbol part of the seventh subframe of the reference carrier 2, and it is determined that a downlink transmission part of the seventh subframe of the first secondary carrier is the same as the downlink transmission symbol part of the seventh subframe of the reference carrier 1.

In this case, the first secondary carrier not only has an uplink transmission subframe, but also has a downlink transmission subframe. When transmission directions of subframes on fourth locations of the two reference carriers are different, a fourth location of the first secondary carrier does not transmit data, that is, neither receives data nor sends data.

Herein, it should be noted that, for a GAP in the seventh subframe of the reference carrier 1, a part, which corresponds to the GAP, of the secondary carrier of the guard band may be configured to be a GAP, or may be configured to be a downlink transmission part. Another part of the first secondary carrier, as a guard band to isolate the reference carrier 1 from the reference carrier 2, does not transmit data because transmission directions of corresponding subframes of the reference carrier 1 and the reference carrier 2 are different. A configured secondary carrier in a guard band is shown in FIG. 8.

It can be known from the above content that, this embodiment of the present invention has the following beneficial effect:

A reference carrier of a first secondary carrier is obtained according to network configuration information, and a transmission direction of a subframe on the first secondary carrier is determined according to a transmission direction of a subframe on the reference carrier, so that data transmission directions of the reference carrier and the first secondary carrier are the same at a same moment. A transmission direction of data of the subframes on the first secondary carrier transmitted in a frequency band adjacent to a frequency band of the reference carrier is determined by using the reference carrier, thereby ensuring that data transmission directions are the same when data is simultaneously transmitted on the first secondary carrier and the reference carrier, and avoiding interference occurring when the adjacent frequency bands simultaneously transmit data of different directions.

Embodiment 2

Figure 9:
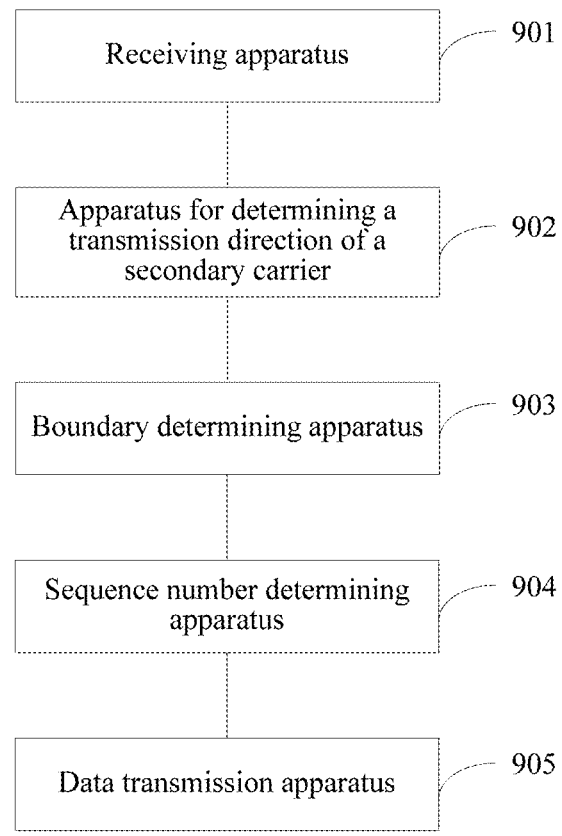
FIG. 9 is a schematic structural diagram of Embodiment 2 of a data transmission device according to the present invention.

FIG. 9 is a schematic structural diagram of Embodiment 2 of a data transmission device according to the present invention. The device is applied to a mobile terminal, and the mobile terminal determines a transmission direction of a subframe on a first secondary carrier. The device includes:

A receiving apparatus 901 is configured to receive a first secondary carrier and a transmission carrier that are configured by a base station, where the transmission carrier includes a primary carrier.

The base station sends the configured first secondary carrier and transmission carrier to the mobile terminal, where the transmission carrier may include only one primary carrier, or may include one primary carrier and at least one second secondary carrier. When sending the configured first secondary carrier and transmission carrier to the mobile terminal, the base station may also send preconfigured network configuration information to the mobile terminal. The preconfigured network configuration information carries an identifier of a reference carrier. Certainly, the base station may also not send the preconfigured network configuration information to the mobile terminal, and instead, the preconfigured network configuration information is preset in the mobile terminal.

The apparatus 902 for determining a transmission direction of a secondary carrier according to any one of claims 1 to 4 is configured to determine a transmission direction of the first secondary carrier.

Content herein is similar to that in Embodiment 1; and refer to descriptions in Embodiment 1, and details are not described herein again.

A boundary determining apparatus 903 is configured to detect a subframe boundary of the reference carrier, and determine a subframe boundary of the first secondary carrier according to the subframe boundary of the reference carrier.

The mobile terminal detects a subframe boundary of the reference carrier and determines a subframe boundary of the first secondary carrier. Herein, the mobile terminal mainly determines a boundary, which corresponds to an uplink data transmission part of a special subframe of the reference carrier, of the first secondary carrier or a boundary, which corresponds to a downlink data transmission part of a special subframe of the reference carrier, of the first secondary carrier.

As shown in FIG. 5, it is determined that a left boundary of an uplink data transmission part of the first secondary carrier is the same as a left boundary of a GAP of a second subframe of the reference carrier. Certainly, it may be further determined that the left boundary of the uplink data transmission part of the first secondary carrier is the same as a left boundary of an uplink transmission symbol part of a second subframe of the reference carrier. A right boundary of the uplink data transmission part of the first secondary carrier is driven to be the same as a boundary of an uplink transmission subframe of a third subframe of the reference carrier. Because except an uplink transmission subframe and a gap GAP, the other parts of the reference carrier transmit downlink data, in this case, to avoid interference between an FDD uplink frequency band and the reference carrier, the first secondary carrier does not transmit data. A configured first secondary carrier is shown in FIG. 5.

As shown in FIG. 6, it is determined that a downlink data transmission part of the first secondary carrier is the same as boundaries of a downlink data transmission part and a GAP of the reference carrier. Alternatively, it may be certainly determined that a downlink data transmission part of the first secondary carrier is the same as only a boundary of a downlink data transmission part of the reference carrier. Because except a downlink transmission subframe and a gap GAP, the other parts of the reference carrier transmit uplink data, in this case, to avoid interference between an FDD downlink frequency band and the reference carrier, a guard band does not transmit data. A configured first secondary carrier is shown in FIG. 6.

As shown in FIG. 8, an uplink transmission symbol part in a second subframe of a reference carrier 1 is shorter than an uplink transmission symbol part in a second subframe of a reference carrier 2, and it is determined that a boundary of an uplink transmission part of a second subframe of the first secondary carrier is the same as a boundary of the uplink transmission symbol part of the second subframe of the reference carrier 1. A downlink transmission symbol part of the second subframe of the reference carrier 2 is shorter than a downlink transmission symbol part of the second subframe of the reference carrier 1, and it is determined that a boundary of a downlink transmission part of the second subframe of the first secondary carrier is the same as a boundary of the downlink transmission symbol part of the second subframe of the reference carrier 2. A downlink transmission symbol part of a seventh subframe of the reference carrier 1 is shorter than a downlink transmission symbol part of a seventh subframe of the reference carrier 2, and it is determined that a boundary of a downlink transmission part of a seventh subframe of the first secondary carrier is the same as a boundary of the downlink transmission symbol part of the seventh subframe of the reference carrier 1.

A sequence number determining apparatus 904 is configured to detect a sequence number of a subframe of the reference carrier, and determine a sequence number of a subframe of the first secondary carrier according to the sequence number of the subframe of the reference carrier.

The mobile terminal detects a sequence number of a subframe of the reference carrier, and sequentially determines a sequence number of a subframe of the first secondary carrier according to the sequence number of the subframe of the reference carrier.

As shown in FIG. 5, if a third subframe of the reference carrier is an uplink transmission subframe, it is determined that the third subframe of the first secondary carrier is also an uplink transmission subframe. If a sequence number of the third subframe of the reference carrier is 2, it is determined that a sequence number of a subframe, which corresponds to the third subframe of the reference carrier, of the first secondary carrier is 2.

As shown in FIG. 6, the first subframe and the fourth subframe to the tenth subframe of the reference carrier are downlink transmission subframes, and it is determined that the first subframe and the fourth subframe to the tenth subframe of the first secondary carrier are also downlink transmission subframes. If a sequence number of the first subframe of the reference carrier is 0, it is determined that a sequence number of a subframe, which corresponds to the first subframe of the reference carrier, of the first secondary carrier is also 0. If a sequence number of the fourth subframe of the reference carrier is 3, it is determined that a sequence number of a subframe, which corresponds to the fourth subframe of the reference carrier, of the first secondary carrier is also 3. If a sequence number of the fifth subframe of the reference carrier is 4, it is determined that a sequence number of a subframe, which corresponds to the fifth subframe of the reference carrier, of the first secondary carrier is also 4. If a sequence number of the sixth subframe of the reference carrier is 5, it is determined that a sequence number of a subframe, which corresponds to the sixth subframe of the reference carrier, of the first secondary carrier is also 5. If a sequence number of the seventh subframe of the reference carrier is 6, it is determined that a sequence number of a subframe, which corresponds to the seventh subframe of the reference carrier, of the first secondary carrier is also 6. If a sequence number of the eighth subframe of the reference carrier is 7, it is determined that a sequence number of a subframe, which corresponds to the eighth subframe of the reference carrier, of the first secondary carrier is also 7. If a sequence number of the ninth subframe of the reference carrier is 8, it is determined that a sequence number of a subframe, which corresponds to the ninth subframe of the reference carrier, of the first secondary carrier is also 8. If a sequence number of the tenth subframe of the reference carrier is 9, it is determined that a sequence number of a subframe, which corresponds to the tenth subframe of the reference carrier, of the first secondary carrier is also 9.

As shown in FIG. 8, the third subframes of two reference carriers both are uplink transmission subframes, and it is determined that the third subframe of the first secondary carrier is also an uplink transmission subframe. If sequence numbers of the third subframes of the two reference carriers are 2, it is determined that a sequence number of the third subframe of the first secondary carrier is also 2.

As shown in FIG. 8, if the first subframes, the fifth subframes, the sixth subframes, and the tenth subframe of two reference carriers all are downlink transmission subframes, it is determined that the first subframe, the fifth subframe, the sixth subframe, and the tenth subframe of the first secondary carrier are also downlink transmission subframes. If sequence numbers of the first subframes of the two reference carriers are 0, it is determined that a sequence number of the first subframe of the first secondary carrier is also 0. If sequence numbers of the fifth subframes of the two reference carriers are 4, it is determined that a sequence number of the fifth subframe of the first secondary carrier is also 4. If sequence numbers of the sixth subframes of the two reference carriers are 5, it is determined that a sequence number of the sixth subframe of the first secondary carrier is also 5. If sequence numbers of the tenth subframes of the two reference carriers are 9, it is determined that a sequence number of the tenth subframe of the first secondary carrier is also 9.

A data transmission apparatus 905 is configured to perform uplink transmission and/or downlink receiving of data by using the first secondary carrier.

The data transmission apparatus 905 has three possible structures.

First possible structure: When the first secondary carrier is a secondary carrier transmitting only uplink data, the data transmission apparatus 905 includes:

a first monitoring unit, configured to monitor PDCCH scheduling information of the first secondary carrier by means of the transmission carrier, where the PDCCH scheduling information includes any one or more of a PDCCH format 0, a PDCCH format 3, or a PDCCH format 3A; and a first transmission unit, configured to transmit uplink data according to the PDCCH scheduling information and by using the first secondary carrier.

When the first secondary carrier transmits only uplink data, there is only an uplink transmission subframe on the first secondary carrier. The mobile terminal monitors only scheduling information about uplink data transmission of the first secondary carrier. Therefore, the mobile terminal monitors only PDCCH scheduling information of a PDCCH format 0, a PDCCH format 3, and a PDCCH format 3A and ignores PDCCH scheduling information of a PDCCH format 1, a PDCCH format 1A, a PDCCH format 1B, a PDCCH format 1C, a PDCCH format 1D, a PDCCH format 2, and a PDCCH format 2A, to reduce a quantity of formats of the PDCCH scheduling information in blind detection, so that mobile terminal can process PDCCH information of the first secondary carrier faster.

The PDCCH scheduling information of the PDCCH format 0, the PDCCH format 3, or the PDCCH format 3A is sent by the base station to the mobile terminal by using a downlink transmission subframe of a transmission carrier. The transmission carrier is a carrier transmitted in a downlink transmission subframe in a TDD frequency band or a carrier transmitted in an FDD downlink frequency band. The mobile terminal transmits uplink data to the base station according to the PDCCH scheduling information and by using the first secondary carrier. Moreover, the mobile terminal does not search for and/or measure any downlink signal for the first secondary carrier.

Second possible structure: When the first secondary carrier is a secondary carrier transmitting only downlink data, a second monitoring unit, configured to monitor PDCCH downlink scheduling information of the first secondary carrier by means of the first secondary carrier or the transmission carrier, where the PDCCH downlink scheduling information includes a PDCCH format 1, a PDCCH format 1A, a PDCCH format 1B, a PDCCH format 1C, a PDCCH format 1D, a PDCCH format 2, or a PDCCH format 2A; and a second transmission unit, configured to receive downlink data according to the PDCCH scheduling information and by using the first secondary carrier.

When the first secondary carrier transmits only downlink data, there is only a downlink transmission subframe on the first secondary carrier. The mobile terminal may receive PDCCH scheduling information, which is sent by the base station, from a downlink transmission subframe of the first secondary carrier or the transmission carrier. Therefore, the mobile terminal monitors only PDCCH scheduling information of any one or more of a PDCCH format 1, a PDCCH format 1A, a PDCCH format 1B, a PDCCH format 1C, a PDCCH format 1D, a PDCCH format 2, or a PDCCH format 2A, and ignores PDCCH scheduling information of a PDCCH format 0, a PDCCH format 3, and a PDCCH format 3A, to reduce a quantity of formats of the PDCCH scheduling information in blind detection, so that mobile terminal can process PDCCH information of the first secondary carrier faster.

Third possible structure: When the first secondary carrier is a secondary carrier not only transmitting uplink data but also transmitting downlink data, a third monitoring unit, configured to monitor PDCCH scheduling information of the first secondary carrier, where the PDCCH scheduling information includes PDCCH uplink scheduling information and PDCCH downlink scheduling information; and a third transmission unit, configured to transmit uplink data and downlink data according to the PDCCH scheduling information and by using the first secondary carrier.

The mobile terminal monitors the PDCCH scheduling information, which is for the first secondary carrier and sent by the downlink transmission subframes of the first secondary carrier or the transmission carrier, of the PDCCH format 0, the PDCCH format 3, and the PDCCH format 3A, and transmits uplink data to the base station according to the PDCCH scheduling information and by using the uplink transmission subframes of the first secondary carrier.

The mobile terminal monitors the PDCCH scheduling information, which is sent by the base station from the downlink transmission subframes of the first secondary carrier or the transmission carrier, of any one or more of the PDCCH format 1, the PDCCH format 1A, the PDCCH format 1B, the PDCCH format 1C, the PDCCH format 1D, the PDCCH format 2, or the PDCCH format 2A, and receives downlink data according to the PDCCH scheduling information and by using the first secondary carrier.

In this case, the mobile terminal not only can receive, by using the downlink transmission subframes of the first secondary carrier, downlink data information sent by the base station, but also can transmit, by using the uplink transmission subframes of the first secondary carrier, uplink data information to the base station.

It can be known from the above content that, this embodiment further has the following beneficial effect:

In this embodiment, in a mobile terminal, a transmission direction of a subframe on a first secondary carrier is determined.

Embodiment 3

Figure 10:
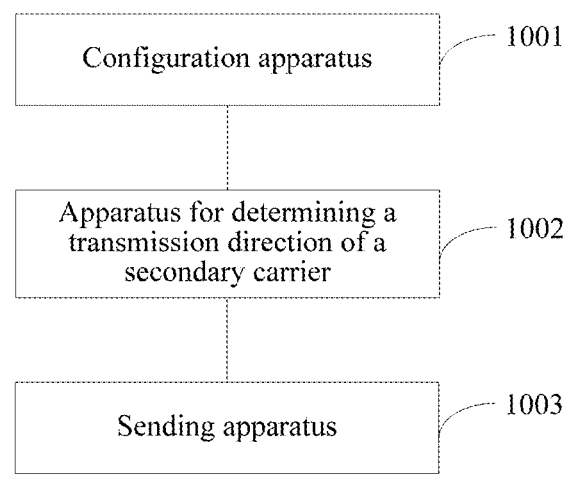
FIG. 10 is a schematic structural diagram of Embodiment 3 of a device for transmitting data by using a secondary carrier according to the present invention.

FIG. 10 is a schematic structural diagram of Embodiment 3 of a device for transmitting data by using a secondary carrier according to the present invention. The device for transmitting data by using a secondary carrier is applied to a base station, and the base station determines a transmission direction of a subframe on a first secondary carrier. The device includes:

A configuration apparatus 1001 is configured to configure a first secondary carrier and a transmission carrier, where the transmission carrier includes a primary carrier.

The base station configures a first secondary carrier and a transmission carrier. The transmission carrier includes at least one primary carrier and may further include at least one second secondary carrier.

The apparatus 1002 for determining a transmission direction of a secondary carrier according to any one of claims 1 to 4 is configured to determine a transmission direction of the first secondary carrier.

The base station determines a transmission direction of a subframe on the first secondary carrier according to preset network configuration information.

Content herein is similar to Embodiment 1; and refer to descriptions in Embodiment 1, and details are not described herein again.

A sending apparatus 1003 is configured to send the first secondary carrier whose transmission direction has been determined and the transmission carrier to a mobile terminal, so that the mobile terminal detects a subframe boundary of the reference carrier, and determines a subframe boundary of the first secondary carrier according to the subframe boundary of the reference carrier; detects a sequence number of a subframe of the reference carrier, and determines a sequence number of a subframe of the first secondary carrier according to the sequence number of the subframe of the reference carrier; and performs uplink receiving and/or downlink transmission of data by using the first secondary carrier.

The base station sends the first secondary carrier whose transmission direction has been determined and the configured transmission carrier to a mobile terminal. The mobile terminal detects a subframe boundary of the reference carrier, and determines a subframe boundary of the first secondary carrier according to the subframe boundary of the reference carrier; detects a sequence number of a subframe of the reference carrier, and determines a sequence number of a subframe of the first secondary carrier according to the sequence number of the subframe of the reference carrier; and performs uplink receiving and/or downlink transmission of data by using the first secondary carrier.

It can be known from the above content that, the present invention further has the following beneficial effect:

In this embodiment, a base station determines a transmission direction of a subframe on a first secondary carrier, and a mobile terminal can determine a subframe boundary and a sequence number of a subframe of the first secondary carrier according to a reference carrier.

Embodiment 4

Figure 11:
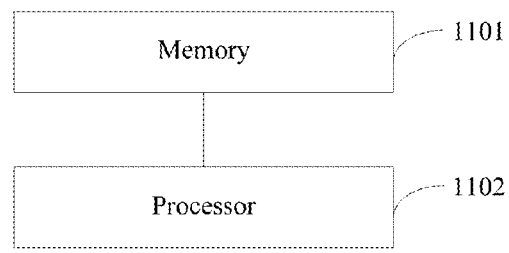
FIG. 11 is a schematic structural diagram of Embodiment 4 of an apparatus for determining a transmission direction of a secondary carrier according to the present invention.

FIG. 11 is a schematic structural diagram of Embodiment 4 of an apparatus for determining a transmission direction of a secondary carrier according to the present invention. The apparatus includes:

a memory 1101 and a processor 1102, where the memory 1101 is configured to store an instruction, the processor 1102 is configured to invoke the instruction, and the instruction includes:

obtaining a reference carrier of a first secondary carrier according to network configuration information; and determining a transmission direction of a subframe on the first secondary carrier according to a transmission direction of a subframe on the reference carrier, so that data transmission directions of the reference carrier and the first secondary carrier are the same at a same moment.

Optionally, when the first secondary carrier is a secondary carrier transmitting only uplink data, the determining a transmission direction of a subframe on the first secondary carrier according to a transmission direction of a subframe on the reference carrier includes:

determining an uplink transmission subframe of the first secondary carrier according to an uplink transmission subframe of the reference carrier; and/or determining an uplink transmission part of a special subframe of the first secondary carrier according to an uplink transmission part and/or a GAP in a special transmission subframe of the reference carrier.

Optionally, when the first secondary carrier is a secondary carrier transmitting only downlink data, the determining a transmission direction of a subframe on the first secondary carrier according to a transmission direction of a subframe on the reference carrier includes:

determining a downlink transmission subframe of the first secondary carrier according to a downlink transmission subframe of the reference carrier; and/or determining a downlink transmission part of a special subframe of the first secondary carrier according to a downlink transmission part and/or a GAP in a special transmission subframe of the reference carrier.

Optionally, when the first secondary carrier is a secondary carrier not only transmitting uplink data but also transmitting downlink data, the determining a transmission direction of a subframe on the first secondary carrier according to a transmission direction of a subframe on the reference carrier includes any one or more of the following steps:

when subframes on first locations of two reference carriers both are uplink transmission subframes, determining a subframe on a first location of the first secondary carrier as an uplink transmission subframe;

when subframes on second locations of two reference carriers both are downlink transmission subframes, determining a subframe on a second location of the first secondary carrier as a downlink transmission subframe;

when there is a special subframe in subframes on third locations of two reference carriers, determining an uplink transmission part of a subframe on a third location of the first secondary carrier according to a part, which is used for uplink transmission or a GAP, in both subframes on the third locations of the two reference carriers; or when there is a special subframe in subframes on third locations of two reference carriers, determining a downlink transmission part of a subframe on a third location of the first secondary carrier according to a part, which is used for downlink transmission or a GAP, in both subframes on the third locations of the two reference carriers.

Embodiment 5

Figure 12:
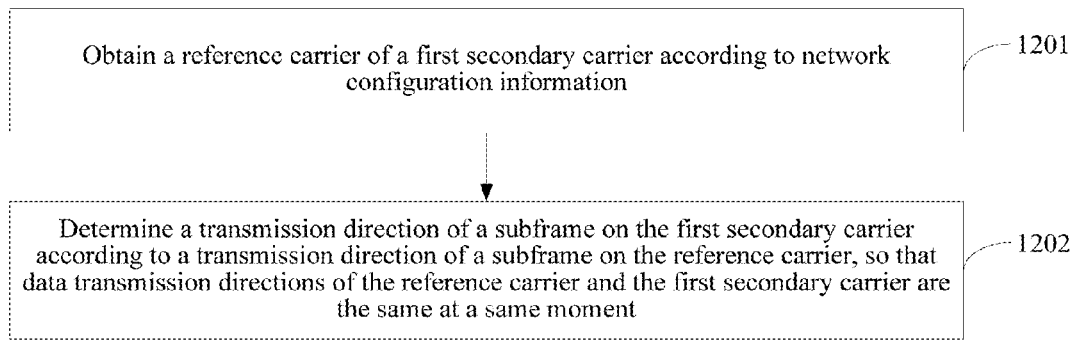
FIG. 12 is a flowchart of Embodiment 5 of a method for determining a transmission direction of a secondary carrier according to the present invention.

FIG. 12 is a flowchart of Embodiment 5 of a method for determining a transmission direction of a secondary carrier according to the present invention. The method is a method corresponding to the apparatus in Embodiment 1, and the method includes:

Step 1201: Obtain a reference carrier of a first secondary carrier according to network configuration information.

Step 1202: Determine a transmission direction of a subframe on the first secondary carrier according to a transmission direction of a subframe on the reference carrier, so that data transmission directions of the reference carrier and the first secondary carrier are the same at a same moment.

The step 1202 has three possible implementation manners.

First possible implementation manner: When the first secondary carrier is a secondary carrier transmitting only uplink data, the determining a transmission direction of a subframe on the first secondary carrier according to a transmission direction of a subframe on the reference carrier includes:

determining an uplink transmission subframe of the first secondary carrier according to an uplink transmission subframe of the reference carrier; and/or determining an uplink transmission part of a special subframe of the first secondary carrier according to an uplink transmission part and/or a GAP in a special transmission subframe of the reference carrier.

Second possible implementation manner: When the first secondary carrier is a secondary carrier transmitting only downlink data, the determining a transmission direction of a subframe on the first secondary carrier according to a transmission direction of a subframe on the reference carrier includes:

determining a downlink transmission subframe of the first secondary carrier according to a downlink transmission subframe of the reference carrier; and/or determining a downlink transmission part of a special subframe of the first secondary carrier according to a downlink transmission part and/or a GAP in a special transmission subframe of the reference carrier.

Third possible implementation manner: When the first secondary carrier is a secondary carrier not only transmitting uplink data but also transmitting downlink data, the determining a transmission direction of a subframe on the first secondary carrier according to a transmission direction of a subframe on the reference carrier includes any one or more of the following steps:

when subframes on first locations of two reference carriers both are uplink transmission subframes, determining a subframe on a first location of the first secondary carrier as an uplink transmission subframe;

when subframes on second locations of two reference carriers both are downlink transmission subframes, determining a subframe on a second location of the first secondary carrier as a downlink transmission subframe;

when there is a special subframe in subframes on third locations of two reference carriers, determining an uplink transmission part of a subframe on a third location of the first secondary carrier according to a part, which is used for uplink transmission or a GAP, in both subframes on the third locations of the two reference carriers; or when there is a special subframe in subframes on third locations of two reference carriers, determining a downlink transmission part of a subframe on a third location of the first secondary carrier according to a part, which is used for downlink transmission or a GAP, in both subframes on the third locations of the two reference carriers; or For step 1201 and step 1202 that are similar to Embodiment 1, refer to descriptions in Embodiment 1, and details are not described herein again.

Embodiment 6

Figure 13:
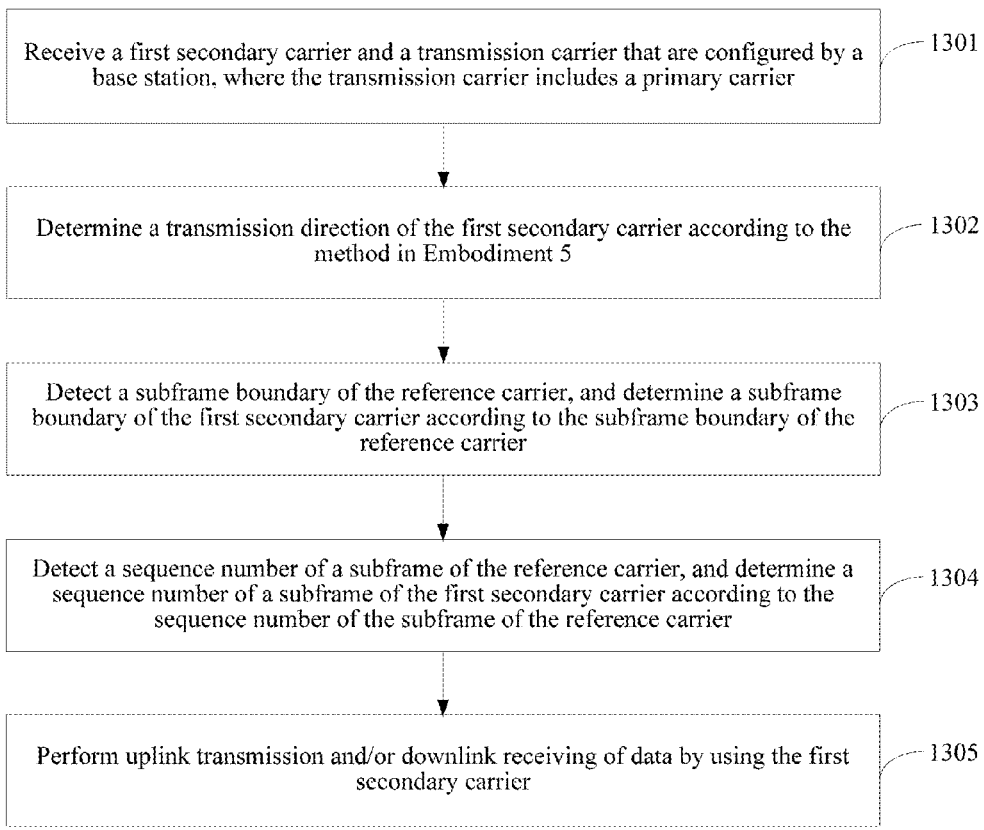
FIG. 13 is a flowchart of Embodiment 6 of a method for transmitting data by using a secondary carrier according to the present invention.

FIG. 13 is a flowchart of Embodiment 6 of a method for transmitting data by using a secondary carrier according to the present invention. The method is applied to a mobile terminal, and the method is a method corresponding to the device in Embodiment 2. The method includes:

Step 1301: Receive a first secondary carrier and a transmission carrier that are configured by a base station, where the transmission carrier includes a primary carrier.

Step 1302: Determine a transmission direction of the first secondary carrier according to the method in Embodiment 5.

Step 1303: Detect a subframe boundary of the reference carrier, and determine a subframe boundary of the first secondary carrier according to the subframe boundary of the reference carrier.

Step 1304: Detect a sequence number of a subframe of the reference carrier, and determine a sequence number of a subframe of the first secondary carrier according to the sequence number of the subframe of the reference carrier.

An execution sequence of step 1303 and step 1304 is not specifically limited. Step 1304 may be first performed, and step 1303 is then performed. Alternatively, step 1303 and step 1304 may be simultaneously performed.

Step 1305: Perform uplink transmission and/or downlink receiving of data by using the first secondary carrier.

The step 1305 has three possible implementation manners.

First possible implementation manner: When the first secondary carrier is a secondary carrier transmitting only uplink data, the performing uplink transmission of data by using the first secondary carrier includes:

monitoring PDCCH scheduling information of the first secondary carrier by means of the transmission carrier, where the PDCCH scheduling information includes any one or more of a PDCCH format 0, a PDCCH format 3, or a PDCCH format 3A; and transmitting uplink data according to the PDCCH scheduling information and by using the first secondary carrier.

Second possible implementation manner: When the first secondary carrier is a secondary carrier transmitting only downlink data, the performing downlink transmission of data by using the first secondary carrier includes:

monitoring PDCCH downlink scheduling information of the first secondary carrier by means of the first secondary carrier or the transmission carrier, where the PDCCH downlink scheduling information includes any one or more of a PDCCH format 1, a PDCCH format 1A, a PDCCH format 1B, a PDCCH format 1C, a PDCCH format 1D, a PDCCH format 2, or a PDCCH format 2A; and receiving downlink data according to the PDCCH scheduling information and by using the first secondary carrier.

Third possible implementation manner: When the first secondary carrier is a secondary carrier not only transmitting uplink data but also transmitting downlink data, the performing transmission of uplink and downlink data by using the first secondary carrier includes:

monitoring PDCCH scheduling information of the first secondary carrier, where the PDCCH scheduling information includes PDCCH uplink scheduling information and PDCCH downlink scheduling information; and transmitting uplink data and downlink data according to the PDCCH scheduling information and by using the first secondary carrier.

In Embodiment 6, a mobile terminal determines a transmission direction of a subframe on a first secondary carrier. For step 1301 to step 1305 that are similar to Embodiment 2, refer to descriptions in Embodiment 2, and details are not described herein again.

Embodiment 7

Figure 14:
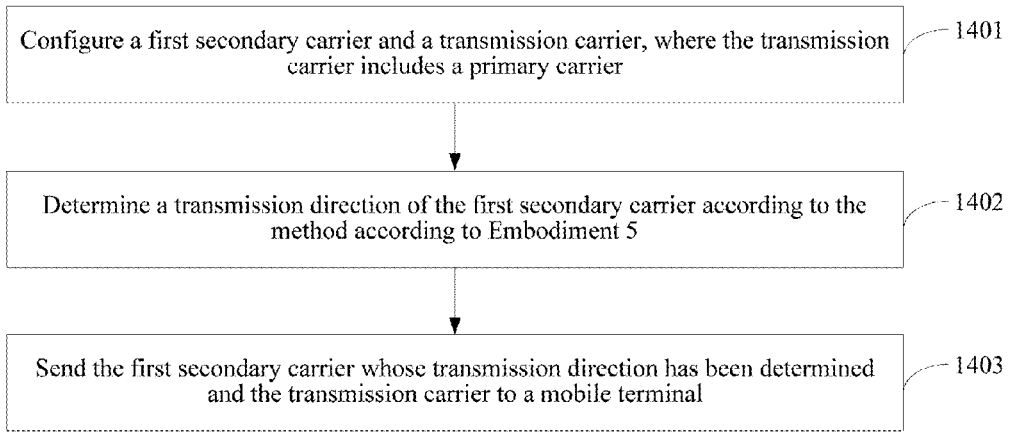
FIG. 14 is a flowchart of Embodiment 7 of a method for transmitting data by using a secondary carrier according to the present invention.

FIG. 14 is a flowchart of Embodiment 7 of a method for transmitting data by using a secondary carrier according to the present invention. The method is applied to a base station and is a method corresponding to the device in Embodiment 3, and the method includes:

Step 1401: Configure a first secondary carrier and a transmission carrier, where the transmission carrier includes a primary carrier.

Step 1402: Determine a transmission direction of the first secondary carrier according to the method according to Embodiment 5.

Step 1403: Send the first secondary carrier whose transmission direction has been determined and the transmission carrier to a mobile terminal.

The mobile terminal detects a subframe boundary of the reference carrier, and determines a subframe boundary of the first secondary carrier according to the subframe boundary of the reference carrier; detects a sequence number of a subframe of the reference carrier, and determines a sequence number of a subframe of the first secondary carrier according to the sequence number of the subframe of the reference carrier; and performs uplink receiving and/or downlink transmission of data by using the first secondary carrier.

In Embodiment 7, a base station determines a transmission direction of a subframe on a first secondary carrier and then sends the transmission direction of the subframes on the first secondary carrier to a mobile terminal. For step 1401 to step 1403 that are similar to Embodiment 3, refer to descriptions in Embodiment 3, and details are not described herein again.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. An apparatus for determining a transmission direction of a secondary carrier in a wireless communication system, comprising:

a memory storing at least one instruction; and a processor, coupled to the memory, configured to execute the at least one instruction stored in the memory to perform a method including obtaining a reference carrier of a secondary carrier according to network configuration information; and determining, when the secondary carrier transmits uplink data and downlink data, a transmission direction of a subframe on the secondary carrier according to a transmission direction of a subframe on the reference carrier, so that the reference carrier and the secondary carrier have a same data transmission direction at a same moment, including at least one of:

when subframes on first locations of two reference carriers both are uplink transmission subframes, determining a subframe on a first location of the secondary carrier as an uplink transmission subframe, when subframes on second locations of two reference carriers both are downlink transmission subframes, determining a subframe on a second location of the secondary carrier as a downlink transmission subframe, when there is a special subframe in subframes on third locations of two reference carriers, determining an uplink transmission part of a subframe on a third location of the secondary carrier according to a part, which is used for uplink transmission or a gap, in both subframes on the third locations of the two reference carriers, and when there is a special subframe in subframes on third locations of two reference carriers, determining a downlink transmission part of a subframe on a third location of the secondary carrier according to a part, which is used for downlink transmission or a gap, in both subframes on the third locations of the two reference carriers.

2. A method for determining a transmission direction of a secondary carrier in a wireless communication system, comprising:

obtaining a reference carrier of a secondary carrier according to network configuration information; and determining, when the secondary carrier transmits uplink data and downlink data, a transmission direction of a subframe on the secondary carrier according to a transmission direction of a subframe on the reference carrier, so that the reference carrier and the secondary carrier have a same data transmission direction at a same moment, including at least one of:

when subframes on first locations of two reference carriers both are uplink transmission subframes, determining a subframe on a first location of the secondary carrier as an uplink transmission subframe;

when subframes on second locations of two reference carriers both are downlink transmission subframes, determining a subframe on a second location of the secondary carrier as a downlink transmission subframe;

when there is a special subframe in subframes on third locations of two reference carriers, determining an uplink transmission part of a subframe on a third location of the secondary carrier according to a part, which is used for uplink transmission or a gap, in both subframes on the third locations of the two reference carriers; and when there is a special subframe in subframes on third locations of two reference carriers, determining a downlink transmission part of a subframe on a third location of the secondary carrier according to a part, which is used for downlink transmission or a gap, in both subframes on the third locations of the two reference carriers.

3. A device for determining a transmission direction in a wireless communication system of a secondary carrier transmitting uplink data and downlink data, comprising:

an obtaining apparatus, configured to obtain a reference carrier of the secondary carrier according to network configuration information; and a determining apparatus, configured to determine a transmission direction of a subframe on the secondary carrier according to a transmission direction of a subframe on the reference carrier as being in a same at a same moment, the determining apparatus including at least one of a first determining sub apparatus, a second determining sub apparatus, a third determining sub apparatus, and a fourth determining sub apparatus, wherein the first determining sub apparatus is configured to, when subframes on first locations of two reference carriers both are uplink transmission subframes, determine a subframe on a first location of the secondary carrier as an uplink transmission subframe;

the second determining sub apparatus is configured to, when subframes on second locations of two reference carriers both are downlink transmission subframes, determine a subframe on a second location of the secondary carrier as a downlink transmission subframe;

the third determining sub apparatus is configured to, when there is a special subframe in subframes on third locations of two reference carriers, determine an uplink transmission part of a subframe on a third location of the secondary carrier according to a part, which is used for uplink transmission or a gap, in both subframes on the third locations of the two reference carriers; and the fourth determining sub apparatus is configured to, when there is a special subframe in subframes on third locations of two reference carriers, determine a downlink transmission part of a subframe on a third location of the secondary carrier according to a part, which is used for downlink transmission or a gap, in both subframes on the third locations of the two reference carriers.

* * * * *